United States Patent [19]

Ishihara

[11] Patent Number: 4,735,978

[45] Date of Patent: Apr. 5, 1988

[54] FLAME RETARDANT POLYCARBONATE COMPOSITION

[75] Inventor: Toshio Ishihara, Evansville, Ind.

[73] Assignee: General Electric Company, Mt. Vernon, Ind.

[21] Appl. No.: 945,992

[22] Filed: Dec. 24, 1986

[51] Int. Cl.$^4$ ................................................. C08K 5/13
[52] U.S. Cl. ..................... 524/162; 524/163; 524/165; 524/158; 524/343
[58] Field of Search ............... 524/162, 163, 165, 158, 524/343, 342, 346, 347

[56] References Cited

U.S. PATENT DOCUMENTS

| | | | |
|---|---|---|---|
| 3,775,367 | 11/1963 | Nouvertne | 252/609 |
| 3,909,490 | 9/1975 | Mark | 524/160 |
| 4,092,291 | 5/1978 | Mark | 524/162 |
| 4,093,589 | 6/1978 | Factor et al. | 524/162 |
| 4,110,387 | 8/1978 | Mark | 524/162 |
| 4,115,354 | 9/1978 | Mark | 524/162 |

*Primary Examiner*—Veronica P. Hoke
*Attorney, Agent, or Firm*—John Schneller; Martin Barancik

[57] ABSTRACT

A flame retardant polycarbonate composition, comprising in admixture:

an aromatic polycarbonate resin, an ortho-methyl substituted aromatic dihydroxy compound, and an additional flame retardant additive, said ortho-methyl substituted aromatic dihydroxy compound and said additional flame retardant additive being present in an amount sufficient to improve the flame retardant properties of said aromatic polycarbonate resin.

11 Claims, No Drawings

FLAME RETARDANT POLYCARBONATE COMPOSITION

FIELD OF THE INVENTION

The invention is directed to flame retardant polycarbonate compositions, and in particular to aromatic carbonate polymers blends including an ortho-methyl substituted aromatic dihydroxy compound.

BACKGROUND OF THE INVENTION

With the increasing public concern for safety, there is a clear need to provide safe materials for commercial and residential use. One particular area of need is to provide flame resistant or flame retardant polymer products. As a result of this demand, many products are required to meet specified flame retardant criteria by both local and federal governments. A well known test for the flammability of polymer materials, such as polycarbonate compositions, is set forth in Underwriter's Laboratories, Bulletin UL-94, Third Edition (1980). This bulletin sets forth tests by which polymer materials are rated for self-extinguishing characteristics.

Many flame retardant additives are known which are employed by mixing with a base polymer to render such polymer self-extinguishing or flame retardant. Such flame retardant additives have been known to be employed in amounts up to about 20 weight percent in order to be effective in extinguishing burning polymer materials. However, it has been found that such high amounts of flame retardant additives can have a degrading effect upon the base polymer, resulting in the loss of valuable physical properties of the base polymer. For example, thermal stability, color and corrosion problems are often associated with prior flame retardant additives. In addition, gases generated during polymer burning may be hazardous if, for example, the flame retardant additive contains halogen. The loss of valuable physical properties when prior flame retardant additives are combined with a base polymer is particularly accute when the base polymer is a polycarbonate resin.

SUMMARY OF THE INVENTION

The present invention relates to polycarbonate compositions having improved flame retardant properties. Particularly it relates to polycarbonate compositions incorporating ortho-methyl derivatives of 2,2-bis(4-hydroxyphenyl) propane, having improved flame retardant properties. The polycarbonate compositions of the present invention are characterized by superior physical properties, compared to the prior flame retardant compositions described above.

Generally, the polycarbonate compositions of the present invention contain an ortho-methyl substituted aromatic dihydroxy compound and may also contain another flame retardant additive. The ortho-methyl substituted aromatic dihydroxy compound and additional flame retardant additive should be present in the polycarbonates of the present invention in amounts sufficient to improve the flame retardant properties of the polycarbonates, as measured by Underwriter's Laboratories Bulletin UL-94, Third Edition (1980).

DETAILED DESCRIPTION OF THE INVENTION

The present invention provides polycarbonate compositions blended with an ortho-methyl substituted aromatic dihydroxy compound and an additional flame retardant additive to improve flame retardant properties. Suitable ortho-methyl substituted aromatic dihyroxy compounds include 2,2-bis(4-hydroxy-3-methylphenyl) propane; 2,2-bis(4hydroxy-3,5-dimethylphenyl) propane; and corresponding compounds in which only one phenol is monoor dimethyl ortho substituted. The preparation of these compounds is known. At least one of these ortho-methyl substituted aromatic dihydroxy compounds is used to prepare the polycarbonate compositions of the present invention.

The polycarbonate resin used in the compositions of the present invention is an aromatic carbonate polymer which may be prepared by reacting a dihydric phenol with a carbonate precursor.

The polycarbonate resin used in the blends of the present invention is an aromatic carbonate polymer which may be prepared by reacting a dihydric phenol with a carbonate precursor such as phosgene, a haloformate, or a carbonate ester. Generally speaking, such aromatic carbonate polymers may be typified as possessing recurring structural units of the formula:

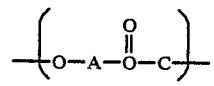

wherein A is a divalent aromatic radical of the dihydric phenol employed in the polymer producing reaction. Preferably, the aromatic carbonate polymers used in the blends of the present invention have an intrinsic viscosity (as measured in methylene chloride in deciliters per gram at 25° C.) ranging from about 0.30 to about 1.00. The dihydric phenols which may be employed to produce such aromatic carbonate polymers are mononuclear or polynuclear aromatic compounds, containing as functional groups two hydroxy radicals, each of which is attached to a carbon atom of an aromatic nucleus. Typical dihydric phenols are:
2,2-bis-(4-hydroxyphenyl)propane; hydroquinone; resorcinol;
2,2-bis-(4-hydroxyphenyl)pentane;
2,4'-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxyphenyl)sulfone;
bis-(3,5-diethyl-4-hydroxyphenyl)sulfone;
2,2-bis-(3,5-dimethyl-4-hydroxyphenyl)propane;
2,4'-dihydroxydiphenyl sulfone;
5'-chloro-2,4'-dihydroxydiphenyl sulfone;
bis-(4-hydroxyphenyl)diphenyl sulfone;
4,4'-dihydroxydiphenyl ether;
4,4'-dihydroxy-3,3'-dichlorodiphenyl ether;
4,4'-dihydroxy-2,5-dimethoxydiphenyl ether;
and the like.

Other dihydric phenols which are also suitable for use in the preparation of the polycarbonates used in the present invention are disclosed in U.S. Pat. Nos. 2,999,835; 3,038,365; 3,334,154; and 4,131,575. The preferred dihydric phenol is 2,2-bis(4-hydroxylphenyl)propane (bisphenol-A).

These aromatic polycarbonates can be manufactured by known processes, for example and as mentioned above, by reacting a dihydric phenol with a carbonate precursor, such as phosgene, in accordance with the methods set forth in the above-mentioned patents, and in U.S. Pat. Nos. 4,018,750 and 4,123,436, or by other processes known to those skilled in the art.

The ortho-methyl substituted aromatic dihydroxy compounds described above are preferably blended with an additional flame retardant additive. Suitable flame retardant additives include metal salts of either monomeric or polymeric aromatic sulfonic acids, and mixtures thereof as described in U.S. Pat. No. 3,933,734, incorporated herein by reference.

Other flame retardant additives useful in the practice of the present invention include metal salts of either monomeric or polymeric aromatic sulfone sulfonic acids, or mixtures thereof as described in U.S. Pat. No. 3,948,851 incorporated herein by reference.

Other flame retardant additives useful in the practice of the present invention include metal salts of a monomeric substituted aromatic sulfonic acid or mixture thereof in which the substituent is an electron withdrawing radical as described in U.S. Pat. No. 3,940,366 incorporated herein by reference.

Other flame retardant additives useful in the practice of the present invention include metal salts of heterocyclic sulfonic acids, or mixtures thereof as described in U.S. Pat. No. 3,919,167 incorporated herein by reference.

Other flame retardant additives useful in the practice of the present invention include metal salts of sulfonic acids of aromatic sulfides, or mixtures thereof as described in U.S. Pat. No. 3,909,490 incorporated herein by reference.

Other flame retardant additives useful in the practice of the present invention include metal salts of either monomeric or polymeric aromatic ether sulfonic acids, or mixtures thereof as described in U.S. Pat. No. 3,953,396 incorporated herein by reference.

Other flame retardant additives useful in the practice of the present invention include metal salts of either monomeric or polymeric phenol ester sulfonic acids, or mixtures thereof as described in U.S. Pat. No. 3,978,024 incorporated herein by reference.

Other flame retardant additives useful in the practice of the present invention include metal salts of halocycloaliphatic aromatic sulfonic acids described in U.S. Pat. No. 3,917,559 incorporated herein by reference.

Other flame retardant additives useful in the practice of the present invention include metal salts of either monomeric or polymeric aromatic amide sulfonic acids, or mixtures thereof as described in U.S. Pat. No. 3,951,910 incorporated herein by reference.

Other flame retardant additives useful in the practice of the present invention include perfluoroalkane sulfonates as described in U.S. Pat. No. 3,775,367, incorporated herein by reference.

Preferred additional flame retardant additives include potassium diphenylsulfonesulfonate (KSS), and sodium trichlorobenzene sulfonate.

The ortho-methyl substituted aromatic dihydroxy compounds described above may be used in combination with any of the additional flame retardant additives discussed above. In addition, mixtures of the flame retardant additives discussed above may be used in combination together with an ortho-methyl substituted aromatic dihydroxy compound.

The flame retardant polycarbonates of the present invention contain from about 0.05 to about 2% flame retardant additives, preferably including an ortho-methyl substituted aromatic dihydroxy compound and an additional flame retardant additive. Usually the ortho-methyl substituted aromatic dihydroxy compound and an additional flame retardant additive constitute about 1% of the flame retardant polycarbonate composition. Within the broad composition ranges specified, many resin mixtures may be prepared in accordance with the subject invention which unexpectedly improve the flame retardant properties.

The compositions of the present invention may be prepared by dry blending the aromatic carbonate polymer resin component, an ortho-methyl substituted aromatic dihydroxy compound, and an additional flame retardant additive until complete dispersion of all of the ingredients is obtained. The resin mixture is then extruded and chopped to form pellets and thereafter molded in accordance with conventional methods. The flame retardant polycarbonate compositions of the present invention may be defined as intimate mixtures of a polycarbonate resin, an ortho-methyl substituted aromatic dihydroxy compound, and an additional flame retardant additive with no covalent bonds between them.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on weight basis unless otherwise specified.

The examples set forth in the Tables below were prepared by blending Lexan-brand polycarbonate (PC); 2,2-bis (4-hydroxy-3,5-dimethylphenyl) propane (TM-BPA); and potassium diphenylsulfonesulfonate (KSS).

TABLE I

| Example | PC | TM-BPA | KSS | Notched Izod | KI |
|---|---|---|---|---|---|
| Control A | 100 | — | — | 98.0 | 5330 |
| 1 | 99 | 1.0 | — | 100.7 | 4710 |
| 2 | 99 | — | 1.0 | 96.3 | 5260 |
| 3 | 99 | 0.7 | 0.3 | 100.2 | 4740 |
| Control B | 100 | — | — | 87.1 | 11550 |
| 4 | 99 | 1.0 | — | 91.4 | 9970 |
| 5 | 99.5 | — | 0.5 | 89.8 | 11030 |
| 6 | 99 | 0.7 | 0.3 | 90.0 | 9980 |

TABLE II

| | Flammability (UL 94) | |
|---|---|---|
| Example | 1.6 mm | 3.2 mm |
| Control A | V2 (5/5) | B (5/4) |
| 1 | V2 (5/5) | V2 (1/5) |
| 2 | V2 (3/5) | V1 (0/0) |
| 3 | V2 (0/5) | V0 (0/0) |
| Control B | V2 (5/5) | — |
| 4 | V2 (5/5) | V2 (0/4) |
| 5 | V2 (0/4) | V0 (0/0) |
| 6 | V2 (0/1) | V0 (0/0) |

In Control A and Examples 1, 2, and 3 the Lexan-brand polycarbonate (PC) was characterized by an intrinsic viscosity of 0.52 to 0.55. In Control B and Examples 4, 5, and 6 the Lexan-brand polycarbonate was branched and was characterized by an intrinsic viscosity of 0.52 to 0.58. Intrinsic viscosity was measured at 25° C. in methylene chloride.

The resistance to impact failure of the flame retardant polycarbonate compositions prepared in accordance with the subject invention was determined with the Notched Izod Impact Test, ASTM D256 on molded test specimens in the form of bars of the following size.

63.5 mm × 12.7 mm × 3.2 mm the latter dimension being the specimen thickness. The test specimens were mounted in accordance with ASTM D256 procedures and were tested at room temperature. Izod impact strengths were determined for all specimens according to ASTM D256 procedures on notched specimens and are reported in kg.-cm/cm of notch.

Also determined for the flame retardant polycarbonate compositions tested is the Kasha Index (KI) which is an indication or a measure of the process ability of the resin, i.e., the lower the KI the greater the melt flow rate and, therefore, the better the processability. Basically, the Kasha Index is a measure of the melt viscosity of the resin. The procedure for determining the Kasha Index is as follows: 7 grams of flame retardant polycarbonate composition pellets, dried a minimum of 90 minutes at 125° C., are added to a modified Tinius-Olsen T3 Melt Indexer. The temperature of the Indexer is maintained at 300° C. and the composition is heated at this temperature for 6 minutes. After 6 minutes the composition is forced through a 1.0478 mm radius orifice using a plunger of radius 4.7371 mm and an applied force of 8.04 kg. The time required for the plunger to travel 50.8 mm is measured in centiseconds and this is reported as the KI. The higher the KI, the higher the melt viscosity and the more viscous the composition, and therefore, the more difficult the composition is to process.

The flamability of each of the compositions was tested according to Underwriter's Laboratories Bulletin UL-94, 3rd edition (1980). Five specimens of each composition including each control composition, were tested. Each specimen was exposed to two ignitions, and the number of specimens which dripped in either the first or second ignition is set forth parenthetically in Table II. As can be seen from Table II, the compositions of the present invention are especially effective in improving the self-extinguishing characteristics of thick polycarbonate sections (3.2 mm). It should also be noted that the presence of the ortho-methyl substituted aromatic dihydroxy compound reduces the quantity of flame retardant salt necessary in the composition.

It is understood that various other modifications will be apparent to and can readily be made by those skilled in the art without departing from the scope and spirit of this invention. Accordingly, it is not intended that the scope of the claims appended hereto be limited to the description set forth herein, but rather that the claims be construed as encompassing all features of patentable novelty which reside in the present invention, including all features which would be treated as equivalents thereof by those skilled in the art to which this invention pertains.

What is claimed is:

1. A flame retardant polycarbonate composition, comprising in admixture:

an aromatic polycarbonate resin, an ortho-methyl derivativeof 2,2-bis(4-hydroxyphenyl) propane, and at least one additional flame retardant additive selected from the group consisting of an alkali metal or alkaline earth metal salt of an aromatic sulfonate, an alkali metal or alkaline earth metal salt of an aromatic sulfonesulfonate, an alkali metal or alkaline earth metal salt of a perfluoroalkyl sulfonate, and mixtures thereof, said orthomethyl derivative of 2,2-bis(4-hydroxyphenyl) propane and said additional flame retardant additive being present in an amount sufficient to improve the flame retardant properties of said aromatic polycarbonate resin.

2. The flame retardant polycarbonate composition set forth in claim 1, wherein said ortho-methyl derivative of 2,2-bis(4-hydroxyphenyl) propane, and said additional flame retardant additive is present in an amount from about 0.05 to about 2 percent by weight based on the weight of the aromatic polycarbonate and said additional flame retardant additive.

3. The flame retardant polycarbonate composition set forth in claim 2, wherein said additional flame retardant additive comprises at least one alkali metal or alkaline earth metal salt of an aromatic sulfonate.

4. The flame retardant polycarbonate composition set forth in claim 2, wherein said additional flame retardant additive comprises at least one alkali metal salt or alkaline earth metal of an aromatic sulfonesulfonate.

5. The flame retardant polycarbonate composition set forth in claim 3, wherein said alkali metal salt is selected from the group consisting of lithium, sodium and potassium salts.

6. The flame retardant polycarbonate composition set forth in claim 4, wherein said alkali metal salt is selected from the group consisting of lithium, sodium and potassium salts.

7. The flame retardant polycarbonate composition set forth in claim 1, wherein said ortho-methyl derivative of 2,2-bis(4-hydroxyphenyl)propane is selected from the group consisting of 2,2-bis(4-hydroxy-3,5-dimethylphenyl) propane, 2,2-bis(4-hydroxy-3-methylphenyl) propane, 2-(4-hydroxy-3,5-dimethylphenyl)-2-(4'-hydroxyphenyl) propane and 2-(4-hydroxy-3-methylphenyl)-2-(4'-hydroxyphenyl) propane.

8. The flame retardant polycarbonate composition set forth in claim 7, wherein said ortho-methyl derivative of 2,2-bis(4-hydroxyphenyl)propane is 2,2-bis(4-hydroxy-3,5-dimethylphenyl) propane.

9. The flame retardant polycarbonate composition set forth in claim 7, wherein said ortho-methyl derivative of 2,2-bis(4-hydroxyphenyl)propane is 2,2-bis(4-hydroxy-3-methylphenyl) propane.

10. The flame retardant polycarbonate composition set forth in claim 7, wherein said ortho-methyl derivative of 2,2-bis(4-hydroxyphenyl)propane is 2-(4-hydroxy-3,5-dimethylphenyl)-2-(4'-hydroxyphenyl) propane.

11. The flame retardant polycarbonate composition set forth in claim 7, wherein said ortho-methyl derivative of 2,2-bis(4-hydroxyphenyl)propane is 2-(4-hydroxy-3-methylphenyl)-2-(4'-hydroxyphenyl) propane.

* * * * *